3,346,426
WIPE-ON PHOSPHATING COMPOSITION
Louis Schlossberg, Oak Park, Mich., assignor to Detrex Chemical Industries, Inc., Detroit, Mich., a corporation of Michigan
No Drawing. Filed Apr. 22, 1964, Ser. No. 361,882
4 Claims. (Cl. 148—6.17)

This invention relates to an improved phosphate coating composition for ferrous and galvanized surfaces. More particularly this invention relates to such a composition which is adapted to be utilized as a wipe-on treatment.

It is known to treat ferrous and galvanized surfaces with phosphatizing composition for the purpose of increasing the paint bonding performance of the treated surface. Among other developments directed to such phosphatizing treatments, may be cited U.S. Patents Nos. 2,121,574; 2,293,716; 2,351,605; 2,375,468; 2,657,156; 2,743,204; and 2,877,148. Some of these require particular equipment, such as for example multistage treating processes including cleaning, rinsing, phosphatizing, and subsequent chromate treatment, such stages being operated with or without the addition of heat. This results in an expensive phosphatizing treatment, and is not readily adaptable for use in such locations as job shops, auto maintenance and repair centers, and other small establishments where it may be desirable to apply a phosphatizing composition to ferrous or galvanized surfaces. Other developments utilize dangerous acid treatments such as treatments involving the use of nitric and sulfuric acids.

It is an object of this invention to provide a phosphating composition which may readily be used to provide a paint bonding phosphate coat on steel and galvanized surfaces by merely wiping on such composition.

It is another object of this invention to provide such a phosphating composition which does not require heat in the wipe-on application.

It is another object of this invention to provide such a phosphating composition which does not require pretreatment or after treatment of the phosphated surface.

These and other objects of this invention have now been accomplished by the discovery that phosphate coatings on the order of 60–300 mgs. per square foot of metal surface may be obtained on steel or galvanized surfaces by the wipe-on application thereto of an aqueous solution containing a phosphating composition having the following approximate compositions, expressed as percent by weight of the final use solution:

| Ingredient: | Percent by weight of solution |
|---|---|
| Zinc | 0.128– 3.84 |
| Phosphoric acid (100%) | 0.400–12.00 |
| Glycolic acid | 0.070– 2.10 |
| 2,4-dinitrobenzenesodiumsulfonate | 0.039– 1.17 |

The foregoing solution may include additionally a nonionic surfactant for simultaneous cleaning, such as, for example, a polyoxyethylene compound. Such a surfactant may effectively be used at a concentration of from about 0.01 percent to about 0.6 percent by weight of the aqueous solution.

In the examples shown in Table I, aqueous solutions were prepared containing varying concentrations of ingredients, as shown. Standard 4 in. by 12 in. mild steel panels were then treated with the solution of each example at room temperature by roll coating for two minutes each using a short nap roller coater. Each panel was then rinsed in tap water for one half minute and dried. The dried panels were each coated without priming with 1½ mils of an acrylic paint which was baked at 300° F. for 30 minutes. Following baking and cooling to room temperature, the painted panels were scribed and exposed in an ASTM B117–61 salt spray cabinet. After 65 hours of such exposure, the panels were removed and examined for evidence of paint creep from the scribe.

TABLE I
[Ingredients expressed as percent by weight of aqueous solution]

| Ex. | Zn (Calc. from ZnO) | $H_3PO_4$ | Glycolic Acid | 2,4-dinitro-benzene-sodium sulfonate | Polyoxy-ethylene Surfactant | Max. Creep at Scribe | Rating |
|---|---|---|---|---|---|---|---|
| 1 | 0.064 | 0.20 | 0.035 | 0.0195 | 0.005 | 12 mm | Very poor. |
| 2 | 0.128 | 0.40 | 0.07 | 0.039 | 0.01 | Nil | Excellent. |
| 3 | 0.32 | 1.00 | 0.175 | 0.0975 | 0.05 | Nil | Do. |
| 4 | 0.64 | 2.00 | 0.35 | 0.195 | 0.10 | Nil | Do. |
| 5 | 0.96 | 3.00 | 0.525 | 0.292 | 0.15 | Nil | Do. |
| 6 | 1.28 | 4.00 | 0.70 | 0.39 | 0.20 | Nil | Do. |
| 7 | 1.60 | 5.00 | 0.875 | 0.487 | 0.25 | Nil | Do. |
| 8 | 1.92 | 6.00 | 1.05 | 0.585 | 0.30 | Nil | Do. |
| 9 | 1.92 | 6.00 | 1.05 | 0.585 | 0 | Nil | Do. |
| 10 | 1.92 | 6.00 | 0.63 | 0.585 | 0.30 | Nil | Do. |
| 11 | 1.92 | 6.00 | 0.84 | 0.585 | 0.30 | Nil | Do. |
| 12 | 1.92 | 6.00 | 1.47 | 0.585 | 0.30 | Nil | Do. |
| 13 | 1.92 | 6.00 | 1.05 | 0.341 | 0.30 | Nil | Do. |
| 14 | 1.92 | 6.00 | 1.05 | 0.39 | 0.30 | Nil | Do. |
| 15 | 1.92 | 6.00 | 1.05 | 0.535 | 0.30 | Nil | Do. |
| 16 | 1.92 | 6.00 | 1.05 | 1.17 | 0.30 | Nil | Do. |
| 17 | 2.56 | 8.00 | 1.40 | 0.78 | 0.40 | Nil | Do. |
| 18 | 3.20 | 10.00 | 1.75 | 0.975 | 0.50 | Nil | Do. |
| 19 | 3.84 | 12.00 | 2.10 | 1.17 | 0.60 | Nil | Do. |
| 20 | 4.48 | 14.00 | 2.45 | 1.36 | 0.70 | 19 mm | Very poor. |

The above examples indicate that excellent results are obtained by utilizing the compositions of this invention containing both glycolic acid and 2,4-dinitrobenzenesodiumsulfonate. However, from the examples shown in Table II, it will be seen that unusually good results are also obtained with such compositions containing 2,4-dinitrobenzenesodiumsulfonate without glycolic acid. Moreover, Examples 21, 22 and 23 indicate that the combination of glycolic acid and 2,4-dinitrobenzenesodiumsulfonate produce a synergistic effect when used in amounts within the ranges herein disclosed and claimed.

TABLE II
[Ingredients expressed as percent by weight of aqueous solution]

| Ex. | Zn (Calc. from ZnO) | $H_3PO_4$ | Glycolic Acid | 2,4-dinitro-benzene-sodium sulfonate | Polyoxy-ethylene Surfactant | Max. Creep at Scribe | Rating |
|---|---|---|---|---|---|---|---|
| 21 | 1.92 | 6.00 | 0 | 0.585 | 0.3 | 3 mm | Good. |
| 22 | 1.92 | 6.00 | 0.585 | 0 | 0.3 | 9 mm | Poor. |
| 23 | 1.92 | 6.00 | 0.293 | 0.293 | 0.3 | Nil | Excellent. |

It is obvious from the above description and the examples that the wipe-on phosphating composition of this invention is particularly advantageous in the provision of superior paint bonding performance with the accompanying easy application of a wipe-on process. Many small metal coating operations not previously adaptable to phosphate coating treatments, may now readily utilize such treatment to commercial advantage.

While in accordance with the provisions of the statutes, I have illustrated and described the best form of embodiment of my invention now known to me, it will be apparent to those skilled in the art that changes may be made in the formulation of the composition described herein without departing from the spirit and scope of the invention as set forth in the appended claims.

Having thus described my invention, I claim:

1. An aqueous phosphate coating composition containing in solution a composition consisting esentially of:

| Ingredient: | Percent by weight of solution |
|---|---|
| Zinc (calc. from ZnO) | 0.128– 3.84 |
| Phosphoric acid (100%) | 0.400–12.00 |
| 2,4-dinitrobenzenesodiumsulfonate | 0.039– 1.17 |

2. The composition of claim 1 wherein said solution contains additionally a polyoxyethylene surfactant in an amount of from about 0.01 percent to about 0.6 percent by weight of the aqueous solution.

3. An aqueous phosphate coating composition containing in solution a composition consisting esentially of:

| Ingredient: | Percent by weight of solution |
|---|---|
| Zinc (calc. from ZnO) | 0.128– 3.84 |
| Phosphoric acid (100%) | 0.400–12.00 |
| Glycolic acid | 0.070– 2.10 |
| 2,4-dinitrobenzenesodiumsulfonate | 0.039– 1.17 |

4. The composition of claim 3 wherein said solution contains additionally a polyoxyethylene surfactant in an amount of from about 0.01 percent to about 0.6 percent by weight of the aqueous solution.

References Cited

UNITED STATES PATENTS

| 2,375,468 | 5/1945 | Clifford et al. | 148—6.15 |
| 2,743,204 | 4/1956 | Russell | 148—6.15 |
| 3,146,133 | 8/1964 | Lantoin | 148—6.15 |
| 3,272,664 | 9/1966 | Schlossberg et al. | 148—6.5 X |

ALFRED L. LEAVITT, *Primary Examiner.*

R. S. KENDALL, *Assistant Examiner.*